United States Patent
Kamata et al.

(10) Patent No.: US 11,910,298 B2
(45) Date of Patent: Feb. 20, 2024

(54) COMMUNICATION DEVICE, VEHICLE, AND METHOD

(71) Applicant: KYOCERA Corporation, Kyoto (JP)

(72) Inventors: Tokiyasu Kamata, Yokohama (JP); Hiroshi Ikegami, Yokohama (JP)

(73) Assignee: KYOCERA Corporation, Kyoto (JP)

(*) Notice: Subject to any disclaimer, the term of this patent is extended or adjusted under 35 U.S.C. 154(b) by 519 days.

(21) Appl. No.: 17/330,633

(22) Filed: May 26, 2021

(65) Prior Publication Data

US 2021/0282081 A1    Sep. 9, 2021

Related U.S. Application Data

(63) Continuation of application No. PCT/JP2019/045315, filed on Nov. 19, 2019.

(30) Foreign Application Priority Data

Nov. 28, 2018 (JP) ................. 2018-222815

(51) Int. Cl.
*H04W 48/16* (2009.01)
*H04W 48/02* (2009.01)
(Continued)

(52) U.S. Cl.
CPC ........... *H04W 48/16* (2013.01); *H04W 48/02* (2013.01); *H04W 60/04* (2013.01); *H04W 60/06* (2013.01)

(58) Field of Classification Search
CPC ..... H04W 48/16; H04W 48/02; H04W 60/04; H04W 60/06; H04W 4/20; H04W 4/44; H04W 8/18
See application file for complete search history.

(56) References Cited

U.S. PATENT DOCUMENTS 10,757,670 B2* 8/2020 Hietalahti ............. H04W 60/04
11,039,377 B2* 6/2021 Lee ....................... H04W 48/04
(Continued)

FOREIGN PATENT DOCUMENTS

CN       105376773 A    3/2016
JP       2018-129771 A  8/2018

OTHER PUBLICATIONS

3rd Generation Partnership Project; Technical Specification Group Core Network and Terminals; Mobile radio interface Layer 3 specification; Core network protocols; Stage 3 (Release 15) 3GPP TS 24.008 V15.4.0 (Sep. 2018); pp. 1-790.

*Primary Examiner* — Julio R Perez (74) *Attorney, Agent, or Firm* — Studebaker & Brackett PC (57) ABSTRACT

A communication device that attaches to a network and performs radio communication, the communication device is configured to receive, from the network, a reject message indicating rejection in response to a request from the communication device to the network or a request for a detach from the network. The communication device is configured to transmit an attach request message to the network. The communication device configured to determine that a state of a service contract with respect to the network is a contract-canceled state when a first condition is satisfied and then a second condition is satisfied, wherein the first condition is a condition that the receiver consecutively receives the reject message from the network over a predetermined time period, and the second condition is a condition that the attach request message transmitted by the transmitter is rejected by the network.

9 Claims, 5 Drawing Sheets

(51) Int. Cl.
  *H04W 60/04* (2009.01)
  *H04W 60/06* (2009.01)

(56) References Cited

U.S. PATENT DOCUMENTS

| | | | | |
|---|---|---|---|---|
| 2014/0038592 | A1* | 2/2014 | Hietalahti | H04W 60/04 455/432.1 |
| 2015/0131437 | A1* | 5/2015 | Kim | H04W 28/0289 370/230 |
| 2018/0139797 | A1* | 5/2018 | Chun | H04W 76/18 |
| 2018/0309783 | A1* | 10/2018 | Nakajima | H04W 12/12 |
| 2018/0376444 | A1* | 12/2018 | Kim | H04W 36/0022 |
| 2023/0379856 | A1* | 11/2023 | Ryu | H04W 60/04 |

* cited by examiner

FIG. 2

COMMUNICATION DEVICE, VEHICLE, AND METHOD

RELATED APPLICATIONS

The present application is a continuation based on PCT Application No. PCT/JP2019/045315, filed on Nov. 19, 2019, which claims the benefit of Japanese Patent Application No. 2018-222815 filed on Nov. 28, 2018. The content of which is incorporated by reference herein in their entirety.

TECHNICAL FIELD

The present invention relates to a communication device, a vehicle, and a method.

BACKGROUND ART

In a mobile communication system, a user of a communication device signs a service contract with a telecommunications operator, whereby the communication device becomes able to use a network provided by the telecommunications operator. When the service contract with the telecommunications operator is canceled, the communication device becomes unable to use the network provided by the telecommunications operator.

Accordingly, communication devices determine and manage such a state of a service contract (under-contract or contract-canceled). For example, when a communication device transmits a Connect Request message to a network and the network accepts an attach, the communication device determines that the communication device is in the under-contract state in which a service contract has been signed.

When the communication device receives, from the network, a reject message indicating rejection in response to the request from the communication device to the network or a request for a detach from the network, the communication device determines, based on a content of the received message, that the communication device is in the contract-canceled state in which the service contract has been canceled.

Specifically, such messages include a reason code (CAUSE value) that is an information element indicating a reason why the network rejects the request from the communication device or a reason for the detach. Reason codes and contents thereof are prescribed in communications standards, and the communication device can determine the contract-canceled state when the reason code is a specified value indicating cancellation (for example, see Non Patent Literature 1).

CITATION LIST

Non Patent Literature

Non patent Literature 1: 3GPP technical specification "3GPP TS 24.008 V15.4.0", September 2018.

SUMMARY OF INVENTION

Technical Problem

Although a communication device can determine the contract-canceled state, based on the specified reason code prescribed in the communications standards, a proprietary reason code of each telecommunications operator may be added in some cases. In such a case, a communication device needs to take into consideration such a proprietary reason code of each telecommunications operator.

However, there are limitations to the method in which the contract-canceled state is determined only based on the specified reason code prescribed in the communications standard, because a communication device possibly attaches to networks of telecommunications operators in various countries of the world, and also because it is difficult to have it ensured that a specification of each network will be maintained semi-permanently.

Accordingly, an object of the present invention is to provide a communication device, a vehicle, and a method that can appropriately determine a state of a service contract.

Solution to Problem

A communication device according to a first feature attaches to a network and performs radio communication. The communication device includes: a receiver configured to receive, from the network, a reject message indicating rejection in response to a request from the communication device to the network or a request for a detach from the network; a transmitter configured to transmit an attach request message to the network; and a controller configured to determine that a state of a service contract with respect to the network is a contract-canceled state when a first condition is satisfied and then a second condition is satisfied, wherein the first condition is a condition that the receiver consecutively receives the reject message from the network over a predetermined time period, and the second condition is a condition that the attach request message transmitted by the transmitter is rejected by the network.

A vehicle according to a second feature includes the communication device according to the first feature.

A method according to a third feature is executed by a communication device that attaches to a network and performs radio communication. The method includes: receiving, from the network, a reject message indicating rejection in response to a request from the communication device to the network or a request for a detach from the network; transmitting an attach request message to the network; and determining that a state of a service contract with respect to the network is a contract-canceled state when a first condition is satisfied and then a second condition is satisfied, wherein the first condition is that the communication device consecutively receives the reject message from the network over a predetermined time period, and the second condition is that the attach request message transmitted by the communication device is rejected by the network.

Advantageous Effect of Invention

According to an aspect of the present invention, a communication device, a vehicle, and a method can be provided that can appropriately determine a state of a service contract and can appropriately determine cancellation.

DESCRIPTION OF EMBODIMENTS

An embodiment will be described below with reference to the drawings.

(Configuration of Mobile Communication System)

Figure 1:
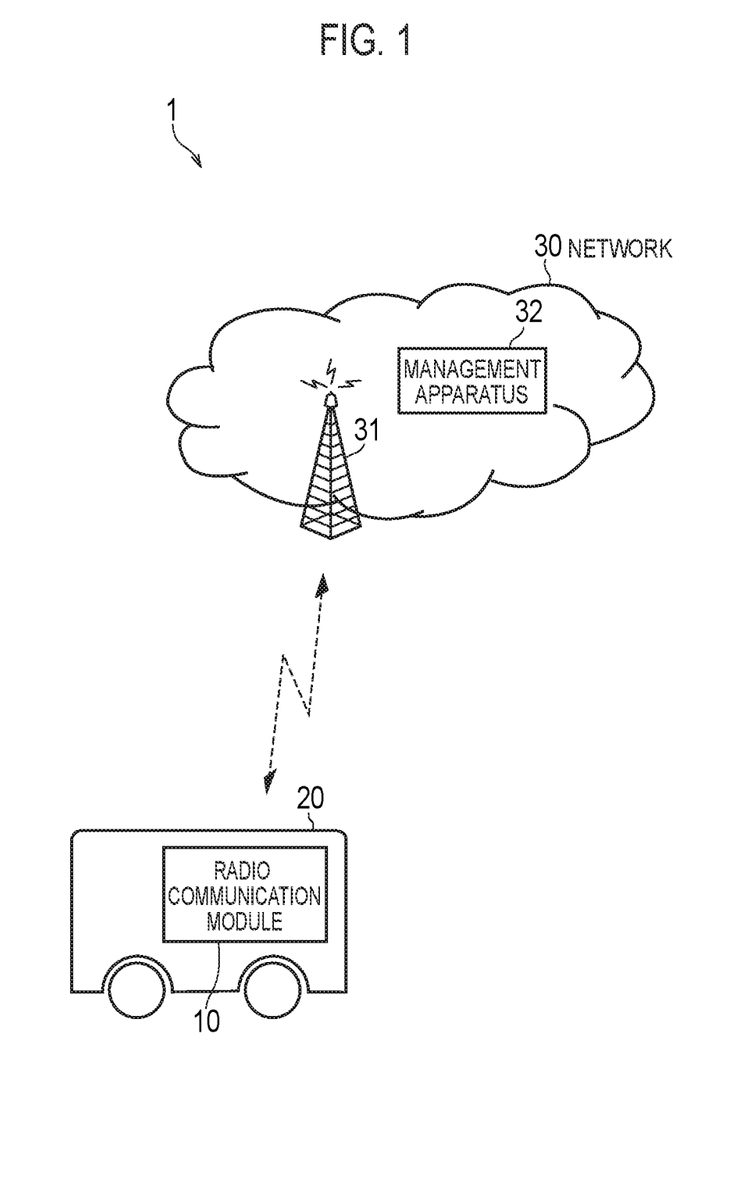
FIG. 1 is a diagram illustrating a configuration of a mobile communication system according to an embodiment.

FIG. 1 is a diagram illustrating a configuration of a mobile communication system 1 according to an embodiment.

As illustrated in FIG. 1, the mobile communication system 1 includes a vehicle 20 with a radio communication module 10 on board, and any one of networks 30 provided by different telecommunications operators. Although an example in which a communication device is the radio communication module 10 will be described in the embodiment, the communication device may be a smartphone, a feature phone, a tablet terminal, a radio communication card, or the like.

The network 30 includes a base station 31 that performs radio communication with the radio communication module 10, and a management apparatus 32 that manages the radio communication module 10. The base station 31 and the management apparatus 32, which may support any mobile communication system, support, for example, a 2G mobile communication system such as GSM® (Global System for Mobile communications), a 3G mobile communication system such as CDMA (Code Division Multiple Access), a 4G mobile communication system such as LTE (Long Term Evolution), or a 5G mobile communication system such as NR (New Radio).

The base station 31 is an apparatus included in a radio access network that is included the network 30. The management apparatus 32 is an apparatus included in a core network that is included in the network 30. In some cases, the management apparatus 32 is referred to as MME (Mobility Management Entity) or AMF (Access and Mobility Management Function).

The management apparatus 32 manages a tracking area in which the radio communication module 10 exists. The management apparatus 32 transmits and receives messages at the NAS (Non-Access Stratum) layer to/from the radio communication module 10 via the base station 31.

The radio communication module 10 is a module that implements various functions. For example, when an emergency call system is implemented, the radio communication module 10, in an emergency, places a call to a PSAP (Public Safety Answering Point) including an emergency call center. After a telephone conversation with a PSAP operator, the radio communication module 10 receives a call from the PSAP in some cases. The radio communication module 10 may be configured to be capable of placing or receiving a call with IP telephony based on VoIP (Voice over Internet Protocol) or the like.

Moreover, a telematics service is known that provides an information service in real time by combining the vehicle 20 and a communication system. In the telematics service, map data and POI (point of interest) data to update data on a navigation system are downloaded from a server on a network 30. Moreover, in the telematics service, diagnostic information on an in-vehicle device is uploaded to the server on the network 30. The radio communication module 10 performs such a download and an upload via networks 30.

In FIG. 1, the radio communication module 10 is illustrated as an IVS (In Vehicle System) mounted in a mobile object such as the vehicle 20. The mobile object may be any object that moves, such as a ship, a train, or a mobile terminal (radio terminal) such as a mobile telephone or a smartphone. The vehicle 20 may be an automobile, such as a two-wheeled automobile, a three-wheeled automobile, or a four-wheeled automobile. The radio communication module 10 may be driven with electricity supplied from a battery of the vehicle 20.

The radio communication module 10 may support a 2G mobile communication system, a 3G mobile communication system, a 4G mobile communication system, or a 5G mobile communication system. The radio communication module 10 may also include a function for executing the various functions and a program created by a user.

A telecommunications operator operating the network 30 provides a mobile communication service of its own to a user who is under contract with the telecommunications operator. A user of the radio communication module 10 signs a service contract with the telecommunications operator, whereby the radio communication module 10 becomes able to use the network 30 provided by the telecommunications operator. When the service contract with the telecommunications operator is canceled, the radio communication module 10 becomes unable to use the network 30 provided by the telecommunications operator.

Accordingly, the radio communication module 10 determines and manages such a state of the service contract (under-contract or contract-canceled). For example, when the radio communication module 10 transmits an attach request message to the network 30 and the network 30 accepts an attach, the radio communication module 10 determines that the radio communication module 10 is in the under-contract state in which the service contract has been signed.

When the radio communication module 10 receives, from the network 30, a reject message indicating rejection in response to the request from the radio communication module 10 to the network 30 or a request for a detach from the network 30, the radio communication module 10 determines, based on the received message, that the radio communication module 10 is in the contract-canceled state in which the service contract has been canceled.

(Configuration of Radio Communication Module)

Figure 2:
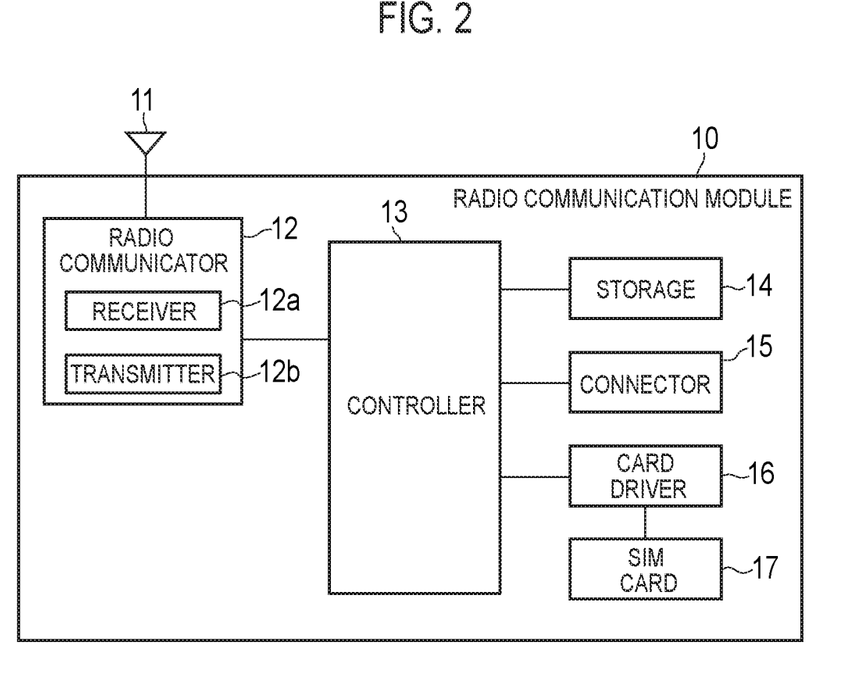
FIG. 2 is a diagram illustrating configurations of the radio communication module according to the embodiment.

FIG. 2 is a diagram illustrating a configuration of the radio communication module 10 according to the embodiment.

As illustrated in FIG. 2, the radio communication module 10 includes an antenna 11, a radio communicator 12, a controller 13, a storage 14, a connector 15, a card driver 16, and a SIM (Subscriber Identity Module) card 17.

The antenna 11 transmits and receives radio signals to/from the base stations 31.

The radio communicator 12 is to perform radio communication with the base stations 31 via the antenna 11. The radio communicator 12 includes a receiver 12a and a transmitter 12b.

The receiver 12a, as analog signal processing, performs amplification, down-conversion, analog-digital conversion processing, and the like of a radio signal received from the antenna 11. The receiver 12a demodulates and decodes a digital signal, and transfers decoded data to the controller 13.

The transmitter 12b, as digital signal processing, encodes data transferred from the controller 13 and modulates the data such that the data can be transmitted through a communication channel of a radio signal. The transmitter 12b, as analog signal processing, performs digital-analog conversion processing of a digital signal, up-conversion, amplification of an analog signal, and the like, and transmits a radio signal via the antenna 11.

The controller 13 is configured mainly by using a microcomputer including a CPU (Central Processing Unit) that executes various programs, a ROM (Read Only Memory), a RAM (Random Access Memory), a backup RAM, an I/O (Input/Output), and the like, and is to perform various types of processing by executing various control programs stored in the ROM. The controller 13 performs processing required to control the radio communicator 12.

The storage 14 is configured by using an EEPROM (Electronically Erasable and Programmable Read Only Memory) or the like, a content of which can be electrically rewritten, and stores a program and information required to control the radio communicator 12.

The connector 15 is an interface for electrically attaching the radio communication module 10 to the vehicle 20, and is, for example, a USB IF (interface), any other IF, or the like. The connector 15 is electrically attached to a user interface (a speaker, a microphone, a display, or the like) provided to the vehicle 20.

The card driver 16 drives an IC (Integrated Circuit) card referred to as SIM card (or UIM (User Identity Module) card), that is, an information card. The card driver 16 may be configured such that the SIM card 17 can be inserted into and removed from the card driver 16. When the card driver 16 is caused by the controller 13 to read or write information, the card driver 16 reads information recorded in the SIM card 17 or writes information into the SIM card 17.

The SIM card 17 is an IC card in which information for identifying a subscriber, operator identification information for identifying a telecommunications operator, information related to a service available under contract to the subscriber, and the like are recorded. Information required to receive the service is recorded in the SIM card 17. Such information is, for example, information used when position information is registered, information related to a telephone number (for example, an IVS telephone number), or the like.

The SIM card 17 may be an eSIM (Embedded SIM) of an embedded type. The SIM card 17 may exist outside of the radio communication module 10. The SIM card 17 may be supplied from the telecommunications operator, or may be obtained by any other ways. The user becomes able to use the radio communication module 10 by installing the supplied SIM card 17 in, or attaching the supplied SIM card 17 to, the radio communication module 10.

(Operation of Radio Communication Module)

Figure 3:
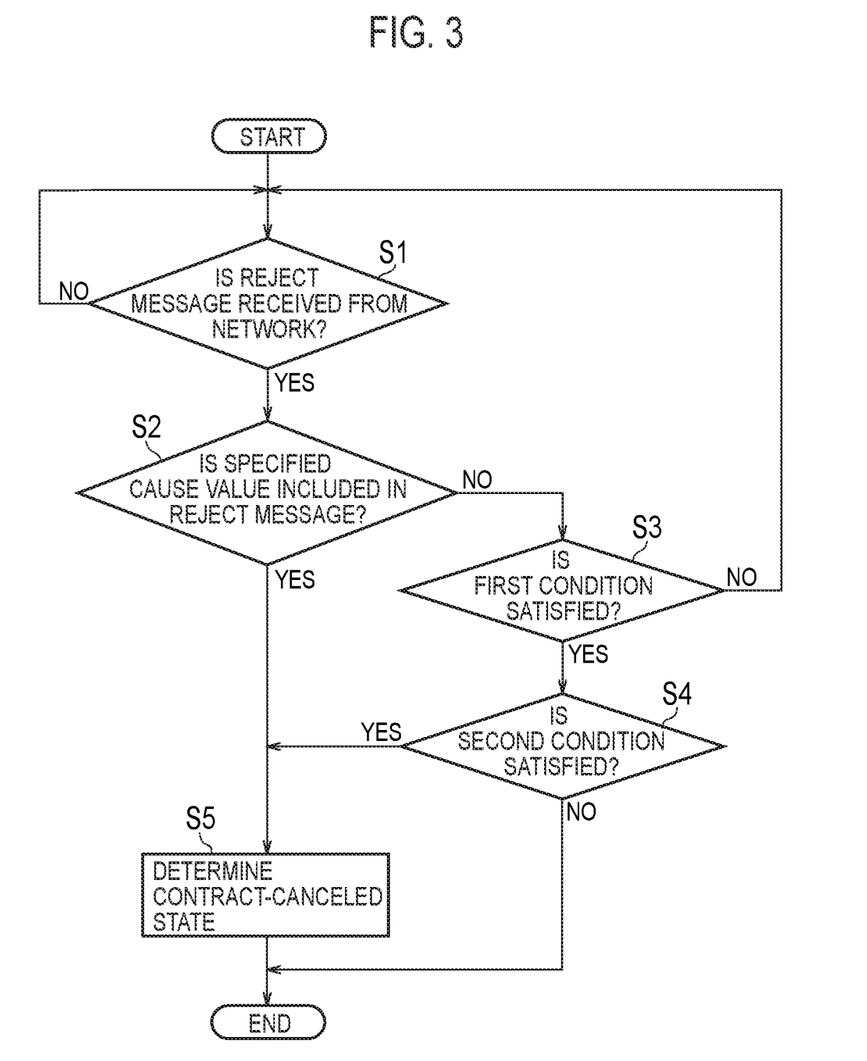
FIG. 3 is a diagram illustrating operation of the radio communication module according to the embodiment.

FIG. 3 is a diagram illustrating operation of the radio communication module 10 according to the embodiment. The controller 13 manages whether a state of a service contract, with respect to a network of a telecommunications operator recorded in the SIM card 17, is the under-contract state or the contract-canceled state. The operation illustrated in FIG. 3 is operation for causing the state of the service contract managed by the controller 13 to transition from the under-contract state to the contract-canceled state.

As illustrated in FIG. 3, in step S1, the controller 13 checks whether or not the receiver 12a receives, from the network 30, a reject message indicating rejection in response to a request from the radio communication module 10 to the network 30 or a request for a detach from the network 30.

In the embodiment, the reject message is a type of NAS message transmitted from the management apparatus 32 to the radio communication module 10. Examples of the reject message include a Connect Reject message that rejects an attach to the network 30, a TAU Reject message that rejects a tracking area update (TAU), a Service Reject message that rejects provision of a service, a Detach Request message that requests a detach, a Routing Area Update Reject message that rejects a routing area update, a Location Area Update Reject message that rejects a location area update, and the like.

When the receiver 12a receives a reject message from the network 30 (step S1: YES), the controller 13 checks in step S2 whether or not a specified CAUSE value is included in the reject message received by the receiver 12a. The CAUSE value corresponds to a reason code and is an information element indicating a reason why the network 30 rejects the request from the radio communication module 10 or a reason for the detach.

The specified CAUSE value is a value prescribed as a value indicating cancellation in the communications standards, and is, for example, "2", "3", "6", "7", "8".

The CAUSE value "2" means that an IMSI (International Mobile Subscriber Identity), which is a subscriber identifier, recorded in the SIM of the radio communication module 10 is not registered in a home location register (HLR) of the network 30. The CAUSE value "3" means that authentication of the radio communication module 10 fails and the radio communication module 10 is illegal. The CAUSE value "6" means that the radio communication module 10 applies to, for example, a blacklist and the radio communication module 10 is illegal. The CAUSE value "7" means that GPRS (General Packet Radio Service) services are not allowed. The CAUSE value "8" means that any of GPRS services and non-GPRS services are not allowed.

When a specified CAUSE value is included in the reject message received by the receiver 12a (step S2: YES), the processing advances to step S5. When no specified CAUSE value is included in the reject message received by the receiver 12a (step S2: NO), the processing advances to step S3.

In step S3, the controller 13 checks whether or not a first condition is satisfied. The first condition is that the receiver 12a consecutively receives a reject message from the network 30 over a predetermined time period. In the embodiment, the first condition may be that after a reject message including no specified CAUSE value is received and before a predetermined time period (for example, five days) passes, the reject message including no specified CAUSE value is consecutively received a predetermined number of times (for example, ten times) or more.

When the first condition is not satisfied (step S3: NO), the processing returns to step S1. When the first condition is satisfied (step S3: YES), the processing advances to step S4.

In step S4, the controller 13 checks whether or not a second condition is satisfied. The second condition is that an attach request message transmitted by the transmitter 12b is rejected by the network 30. Specifically, the controller 13 checks whether or not the receiver 12a receives a Connect Reject message responding to the attach request message transmitted by the transmitter 12b.

When the second condition is not satisfied (step S4: NO), that is, when the attach request message is accepted by the network 30, the service contract is managed as being effective by the network 30, so that the contract-canceled state is not determined, and the present flow is terminated. When the second condition is satisfied (step S4: YES), the processing advances to step S5.

In step S5, the controller 13 determines that the state of the service contract with respect to the network 30 is the contract-canceled state, and causes the state of the service contract managed by the controller 13 to transition from the under-contract state to the contract-canceled state.

In step S5, the controller 13 may restrict execution of a function that uses the network 30. For example, the controller 13 can restrict useless voice transmission and data communication by disabling an application that uses the network 30.

For the radio communication module 10 in particular that is driven by a battery of the vehicle 20, it is desirable to avoid unnecessary communication because power consumption of the battery needs to be reduced.

When the controller 13 determines the contract-canceled state in step S5, the controller 13 stops data communication performed by using the application so that an attach request is not made to the network 30, whereby power consumption of the battery of the vehicle 20 can be reduced.

In step S5, the controller 13 may perform processing of notifying the contract-canceled state to the user of the radio communication module 10. For example, the controller 13 outputs, via the connector 15, information for notifying the contract-canceled state to the user of the radio communication module 10. As a result, information indicating the contract-canceled state is presented to the user by a user interface provided to the vehicle 20. Thus, the user can come to know that the radio communication module 10 is in the contract-canceled state, without conducting a visual check or the like directly on the radio communication module 10.

As described above, according to the present operation flow, even when a reject message received by the receiver 12*a* from the network 30 does not include a specified CAUSE value (for example, "2", "3", "6", "7", "8") prescribed as a value indicating cancellation in the communications standards, the controller 13 determines that the state of the service contract is the contract-canceled state when the first condition is satisfied and then the second condition is satisfied.

Thus, it can be determined that the state of the service contract is the contract-canceled state, without depending on the specified CAUSE values prescribed in the communications standards. Accordingly, the state of the service contract can be appropriately determined even when a proprietary CAUSE value of each telecommunications operator is added, or when a specification of each network is changed.

In determination as to the first condition, it is necessary to wait until the predetermined time period passes, and it is therefore possible that the radio communication module 10 is out of range when the predetermined time period has passed. However, it is not preferable to make a determination of the contract-canceled state when the radio communication module 10 is out of range. Accordingly, the contract-canceled state is not determined immediately when the first condition is satisfied, but a configuration is made such that the contract-canceled state is determined when the second condition, in addition to the first condition, is satisfied.

Here, a case will be assumed where the radio communication module 10 consecutively receives a reject message from the network 30 a predetermined number of times (for example, 10 times) or more due to network failure or the like, and the vehicle 20 with the radio communication module 10 on board, immediately thereafter, is left at an underground garage (in an out-of-range state) for a predetermined time period (for example, five days) or longer. In such a case, if the controller 13 determines the contract-canceled state after the first condition is satisfied, the erroneous determination is made despite a fact that the service contract is not canceled.

Accordingly, the controller 13 determines the contract-canceled state when the first condition is satisfied and then the second condition is also satisfied, whereby an erroneous determination can be avoided. Specifically, since it is hardly conceivable that network failure continues for, for example, five or more days, cancellation is determined by receiving anew a reject message from the network 30 in the in-range state (that is, by the second condition being satisfied).

When a specified CAUSE value (for example, "2", "3", "6", "7", "8") is included in a reject message received by the receiver 12*a* from the network 30, the controller 13 determines that the state of the service contract is the contract-canceled state, irrespective of the first condition and the second condition. Thus, a determination of cancellation can be made quickly.

Figure 4:
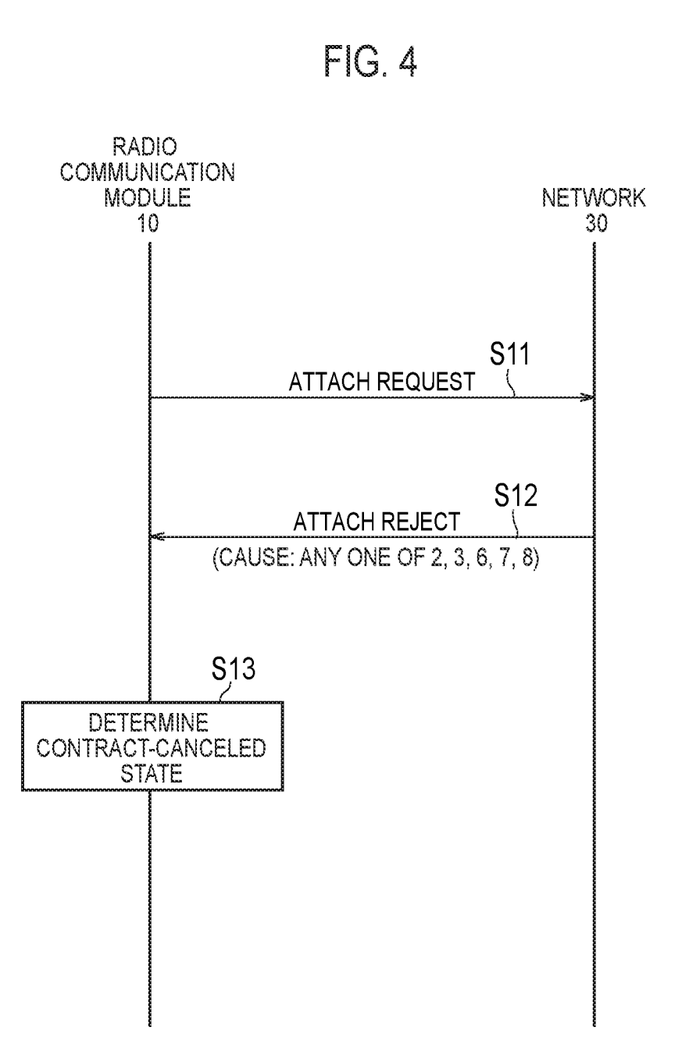
FIG. 4 is a diagram illustrating an example of operation of the radio communication module according to the embodiment.

FIG. 4 is a diagram illustrating an example of operation of the radio communication module 10 according to the embodiment.

As illustrated in FIG. 4, in step S11, the controller 13 of the radio communication module 10 transmits an attach request message to the network 30 via the transmitter 12*b*.

In step S12, the management apparatus 32 of the network 30 transmits a Connect Reject message to the radio communication module 10 via the base station 31. The Connect Reject message includes a specified CAUSE value (for example, any one of "2", "3", "6", "7", "8"). The receiver 12*a* of the radio communication module 10 receives the Connect Reject message including the specified CAUSE value.

In step S13, the controller 13 of the radio communication module 10 immediately determines the contract-canceled state, based on a fact that the receiver 12*a* receives the Connect Reject message including the specified CAUSE value.

Figure 5:
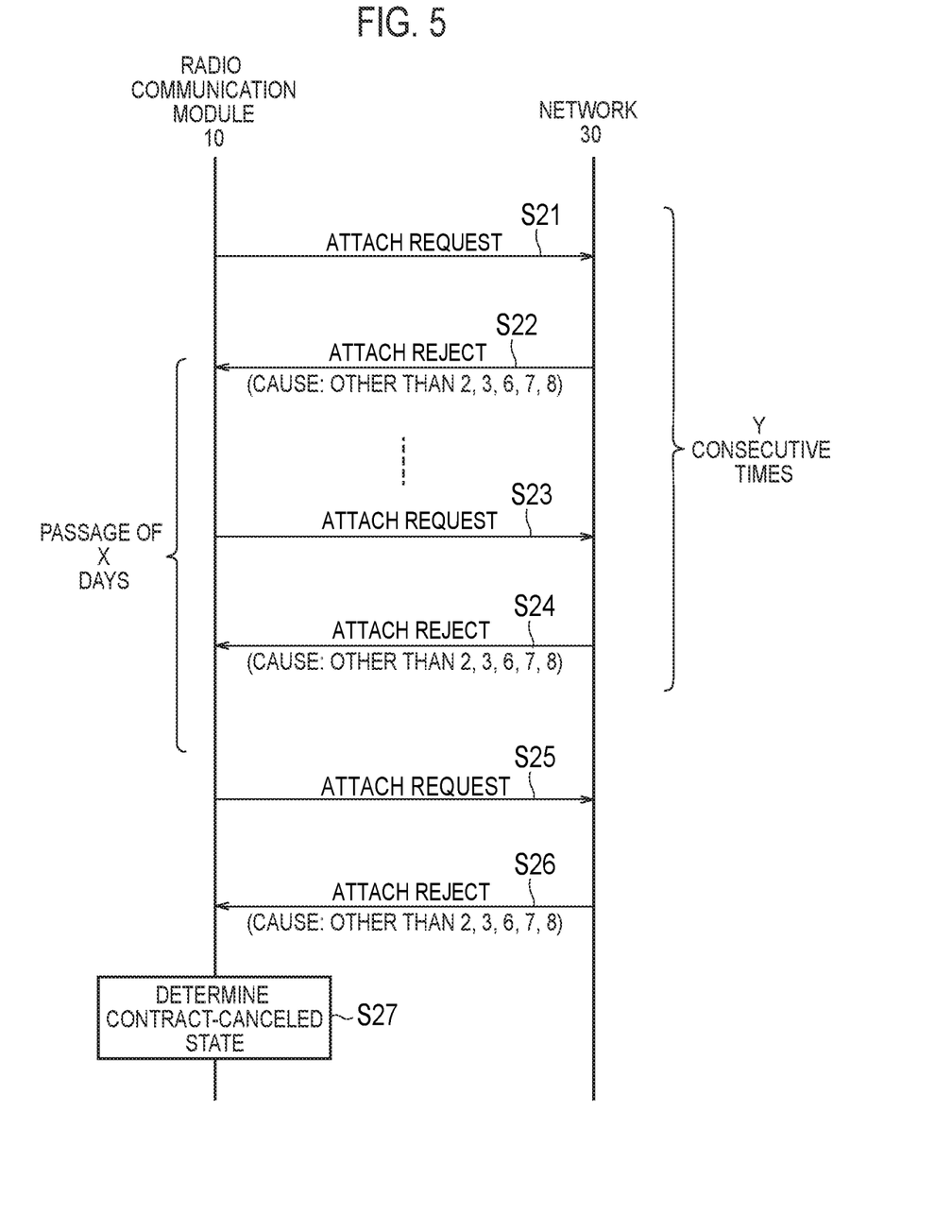
FIG. 5 is a diagram illustrating another example of operation of the radio communication module according to the embodiment.

FIG. 5 is a diagram illustrating another example of operation of the radio communication module 10 according to the embodiment.

As illustrated in FIG. 5, in step S21, the controller 13 of the radio communication module 10 transmits an attach request message to the network 30 via the transmitter 12*b*.

In step S22, the management apparatus 32 of the network 30 transmits a Connect Reject message to the radio communication module 10 via the base station 31. The Connect Reject message includes a CAUSE value other than the specified CAUSE values (for example, "2", "3", "6", "7", "8").

When the receiver 12*a* of the radio communication module 10 receives the Connect Reject message including the CAUSE value other than the specified CAUSE values, the controller 13 of the radio communication module 10 starts counting the number of days and counting the number of rejections.

Thereafter, in step S23, the controller 13 of the radio communication module 10 transmits an attach request message to the network 30 via the transmitter 12*b*.

In step S24, the management apparatus 32 of the network 30 transmits a Connect Reject message to the radio communication module 10 via the base station 31. The Connect Reject message includes a CAUSE value other than the specified CAUSE values (for example, "2", "3", "6", "7", "8"). At a present point of time, it is assumed that the number of counted rejections reaches a predetermined number (Y). Thereafter, it is assumed that the number of counted days reaches a predetermined time period (X days). As a result, the controller 13 of the radio communication module 10 confirms that the first condition is satisfied.

After the first condition is satisfied, in step S25, the controller 13 of the radio communication module 10 transmits an attach request message to the network 30 via the transmitter 12b.

In step S26, the management apparatus 32 of the network 30 transmits a Connect Reject message to the radio communication module 10 via the base station 31. The Connect Reject message includes a CAUSE value other than the specified CAUSE values (for example, "2", "3", "6", "7", "8"). When the receiver 12a of the radio communication module 10 receives the Connect Reject message including the CAUSE value other than the specified CAUSE values, the controller 13 of the radio communication module 10 confirms that the second condition is satisfied.

In step S27, the controller 13 of the radio communication module 10 determines the contract-canceled state, based on a fact that the first condition and the second condition are satisfied.

Other Embodiments

A program may be provided to cause a computer to execute the operations of the radio communication module 10. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM. The radio communication module 10 may be embodied as a semiconductor integrated circuit (chipset, SoC, etc.) by integrating the circuits that execute the respective operations of the radio communication module 10.

While embodiments have been described in detail with reference to the drawings, specific configurations are not limited to the ones mentioned above and various design changes and the like can be made without departing from the scope of the invention.

The invention claimed is:

1. A communication device that attaches to a network and performs radio communication, the device comprising:
   a receiver configured to receive, from the network, a reject message indicating rejection in response to a request from the communication device to the network or a request for a detach from the network;
   a transmitter configured to transmit an attach request message to the network; and
   a controller configured to determine that a state of a service contract with respect to the network is a contract-canceled state when a first condition is satisfied and then a second condition is satisfied, wherein
   the first condition is a condition that the receiver consecutively receives the reject message from the network over a predetermined time period, and the second condition is a condition that the attach request message transmitted by the transmitter is rejected by the network.

2. The communication device according to claim 1, wherein
   the reject message includes a reason code indicating a reason why the network rejects the request from the communication device or a reason why the network performs the detach, and
   the controller is configured to determine that the state of the service contract is the contract-canceled state when the first condition is satisfied and then the second condition is satisfied, even when the reject message received by the receiver from the network does not include a specified reason code prescribed as a value indicating cancellation in communications standards.

3. The communication device according to claim 2, wherein
   the first condition is a condition that after the reject message that does not include the specified reason code is received and before the predetermined time period passes, the reject message that does not include the specified reason code is consecutively received a predetermined number of times or more.

4. The communication device according to claim 2, wherein
   the controller is configured to determine that the state of the service contract is the contract-canceled state, irrespective of the first condition and the second condition, when the reject message received by the receiver from the network includes the specified reason code.

5. The communication device according to claim 1, wherein
   the controller is configured to restrict execution of a function that uses the network, based on a fact that it is determined that the state of the service contract is the contract-canceled state.

6. The communication device according to claim 1, wherein
   the controller is configured to perform processing of notifying the contract-canceled state to a user of the communication device, based on a fact that it is determined that the state of the service contract is the contract-canceled state.

7. The communication device according to claim 6, further comprising a connector configured to electrically connect to a vehicle, wherein
   the controller is configured to output, via the connector, information for notifying the contract-canceled state to the user of the communication device.

8. A vehicle comprising the communication device according to claim 1.

9. A method executed by a communication device that attaches to a network and performs radio communication, the method comprising:
   receiving, from the network, a reject message indicating rejection in response to a request from the communication device to the network or a request for a detach from the network;
   transmitting an attach request message to the network; and
   determining that a state of a service contract with respect to the network is a contract-canceled state when a first condition is satisfied and then a second condition is satisfied, wherein the first condition is that the communication device consecutively receives the reject message from the network over a predetermined time period, and the second condition is that the attach request message transmitted by the communication device is rejected by the network.

* * * * *